(12) United States Patent
Bennett (10) Patent No.: US 11,342,741 B2
(45) Date of Patent: May 24, 2022

(54) EQUIPMENT CONTROL BASED ON ENVIRONMENTAL MONITORING SYSTEM

(71) Applicant: James M. Bennett, Arroyo Grande, CA (US)

(72) Inventor: James M. Bennett, Arroyo Grande, CA (US)

( * ) Notice: Subject to any disclaimer, the term of this patent is extended or adjusted under 35 U.S.C. 154(b) by 0 days.

(21) Appl. No.: 17/013,176

(22) Filed: Sep. 4, 2020

(65) Prior Publication Data

US 2022/0077676 A1  Mar. 10, 2022

(51) Int. Cl.
*H02H 7/00* (2006.01)
*H02H 7/22* (2006.01)
*H02H 1/00* (2006.01)
*G01W 1/02* (2006.01)
*G01K 3/00* (2006.01)
*G01P 5/02* (2006.01)

(52) U.S. Cl.
CPC .............. *H02H 7/22* (2013.01); *G01K 3/005* (2013.01); *G01P 5/02* (2013.01); *G01W 1/02* (2013.01); *H02H 1/0007* (2013.01)

(58) Field of Classification Search
None
See application file for complete search history.

(56) References Cited

U.S. PATENT DOCUMENTS 4,242,628 A  12/1980 Mohan
4,311,995 A * 1/1982 Kinzie ............... A01D 41/1276
                                                                  340/607
6,927,695 B2  8/2005 Hayden
7,663,260 B2  2/2010 Kabatzke
(Continued)

FOREIGN PATENT DOCUMENTS

AU       2007276440 A1 *  1/2008  ............ F03D 7/042
WO   WO-2017084674 A1 *  5/2017  ........... F03D 7/0268

OTHER PUBLICATIONS

NBC; "High Winds Could Prompt SCE to Cut Power to Some Transmission Lines"; http://www.nbclosangeles.com/local/high-winds-could-prompt-sce-to-cut-power-to-some-transmission-lines/171381/; Nov. 7, 2018; 7 pages.

*Primary Examiner* — Stephen W Jackson
(74) *Attorney, Agent, or Firm* — Fitch, Even, Tabin & Flannery LLP (57) ABSTRACT

The techniques described herein may provide for more efficient power management of equipment based on weather conditions. For instance, weather measurements (e.g., or weather forecasts based on weather measurements) may be used to determine whether or not to initiate a power disconnect procedure. When some weather condition (e.g., wind, temperature, rain, humidity, etc.) exceeds a threshold, a power disconnect procedure may be initiated such that a power source of certain equipment may be disconnected from a power distribution system. In some examples, an environmental monitor may send environmental measurements or conditions to a programmable processor. In instances where the programmable processor determines that some environmental threshold or condition has been met, the programmable processor may send a disconnect signal (e.g., a disconnect power signal) to a power disconnect device. The power disconnect device may thus disconnect the power distribution system from the power source.

10 Claims, 6 Drawing Sheets

(56) References Cited

U.S. PATENT DOCUMENTS

| | | |
|---|---|---|
| 7,826,933 B2 | 11/2010 | Fickey |
| 7,928,604 B2 | 4/2011 | Page |
| 10,454,783 B2 | 10/2019 | Burks |
| 2018/0364295 A1 | 12/2018 | Schwartz |
| 2019/0133880 A1 | 5/2019 | Potucek |

* cited by examiner

EQUIPMENT CONTROL BASED ON ENVIRONMENTAL MONITORING SYSTEM

BACKGROUND OF THE INVENTION

1. Field of the Invention

The present invention relates generally to equipment control, and more specifically to disconnecting a power distribution system from a power source.

2. Discussion of the Related Art

Various systems and processes are known in the art for disconnecting a power distribution system from a power source.

In some cases, it is desirable to disconnect a power distribution system from a power source in the event of a natural occurrence such as a fire. Fire is a combustion process that releases light, heat, and various reaction products. Often, fire affects various ecological systems (e.g., including humans, wildlife, etc.). In some cases, fire may be classified (e.g., as a rural fire, a forest fire, a wildfire, etc.) based on physical properties of the fire, the combustible material present in the fire, and the cause of ignition, among other examples. For instance, a wildfire may refer to a fire (e.g., an uncontrolled fire) in rural areas (e.g., in an area of combustible vegetation present in rural areas). Wildfire behavior, as well as the severity of a wildfire, may depend on various circumstances such as physical setting, available fuels, and weather.

In some cases, wildfires may cause damage or loss of human life, property, ecological systems, earth resources etc. For instance, fires (e.g., wildfires) starting or advancing during high winds in dry vegetation may result in rapid growth of the fire (e.g., due to available dry vegetation fuel and wind advancement). The destruction caused by such fires may be extensive. Accordingly, improved techniques for reducing and mitigating fires may be desired

SUMMARY

Generally, methods, apparatuses, and systems supporting techniques for efficient equipment power control are described. The techniques described herein may provide for more efficient power management of equipment based on weather conditions. For instance, weather measurements (e.g., or weather forecasts based on weather measurements) may be used to determine whether or not to initiate a power disconnect procedure. When some weather condition (e.g., wind, temperature, rain, humidity, etc.) exceeds a threshold, a power disconnect procedure may be initiated such that a power source of certain equipment may be disconnected from a power distribution system.

In some examples, an environmental monitor (e.g., which may include some combination of a wind sensor, a temperature sensor, a rain sensor, a humidity sensor, etc.) may send environmental measurements or conditions to a programmable processor. In instances where the programmable processor determines that some environmental threshold or condition has been meet (e.g., based on the environmental measurements or conditions indicated by the environmental monitor), the programmable processor may send a disconnect signal (e.g., a disconnect power signal) to a power disconnect device. The power disconnect device may thus disconnect the power distribution system from the power source.

An apparatus, system, and method for disconnecting a power distribution system from a power source are described. Embodiments of the apparatus, system, and method include a power disconnect device coupled to the power source and the power distribution system, wherein the power disconnect device is configured to disconnect the power source from the power distribution system upon receiving a disconnect signal, a wind sensor configured to determine a wind measurement and send a wind measurement signal indicating the wind measurement, and a programmable processor configured to receive the wind measurement signal from the wind sensor and send the disconnect signal to the power disconnect device. The apparatus, system, and method may be configured to determine the wind measurement, send the wind measurement signal to the programmable processor, determine if the wind measurement signal exceeds a predetermined windspeed value, and send the disconnect signal to the power disconnect device upon determining that the wind measurement signal exceeds the predetermined windspeed value, whereby the power distribution system is disconnected from the power source.

A method, apparatus, and non-transitory computer readable medium for disconnecting a power distribution system from a power source are described. Embodiments of the method, apparatus, and non-transitory computer readable medium include measuring, by a wind sensor, of a wind measurement, sending, by the wind sensor, of a wind measurement signal indicating the wind measurement, receiving, by a programmable processor, of the wind measurement signal, determining, by the programmable processor, if the wind measurement signal exceeds a predetermined windspeed value, sending a disconnect signal to a power disconnect device in response to determining that the wind measurement signal exceeds the predetermined windspeed value, and disconnecting from the power source by the power disconnect device of the power distribution system in response to receiving the disconnect signal.

DETAILED DESCRIPTION

The following description is not to be taken in a limiting sense but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Fires (e.g., such as wildfires) may result in damage and loss of human life, property, ecological systems, earth resources, etc. In some cases, fires may be started by electrical lines or electrical equipment during high wind events. For instance, high wind events may cause electrical equipment or electrical lines to fail (e.g., fall, disconnect, etc.) which may then contact trees, brush, or other vegetation. Such may result in sparks that may catch fuel in the form of the contacted trees, brush, vegetation, etc. Fires starting during high winds in dry vegetation may be disastrous in terms of resulting damage.

Some strategies or techniques for reduction or mitigation of such fires may include predicting high wind events using weather prediction methods and then manually deenergize (e.g., disconnect power of) at risk electrical equipment and/or power lines. The strategy of manually deenergizing power based on weather prediction may be somewhat effective (e.g., based on the effectiveness or accuracy of associated weather predictions). In some cases, micro weather events may occur within an area that are not well modelled. Additionally, when conservative measures are taken (e.g., turning off the power well in advance of a possible high wind event), a perception may arise that the power was deenergized in too widespread of an area. For instance, utilities may be blamed for turning off the power needlessly when the predicted weather does not materialize.

On the other hand, when less than conservative measures are taken, fires may then result from equipment or power lines that should have been deenergized. Further, turning power off can cause financial harm to businesses and turning power off to homes can put people at risk that rely on electrical power to run home medical support equipment such as oxygen machines. In some cases, power outages in stores, businesses, and homes can result in loss of frozen or refrigerated food to spoilage.

Ultimately, inefficient power control of certain equipment (e.g., electrical equipment, electrical wires, etc. serving rural areas, businesses, etc.) may result in wildfires (e.g., when power control systems are not stringent enough) or various other risks (e.g., such as financial harm to businesses, loss of power in homes, etc.). Improved techniques for selectively turning power off when the associated equipment is at-risk may be desired.

Accordingly, the techniques described herein may provide for more effective power control solutions, such that power may be turned off with greater precision and accuracy. For instance, when certain environmental conditions exist (e.g., such as high windspeed, heat caused by on coming fire, etc.) specific at-risk electrical equipment may be automatically deenergized. For example, specific at-risk electrical equipment may be automatically detached from a power distribution system when an environmental condition achieves some actual value (e.g., or threshold) that has been predetermined. As an example, much like an electrical breaker that protects against an actual overcurrent event (e.g., as opposed to a predicted overcurrent event), a wind actuated breaker or power disconnect may turn off the power when the predetermined windspeed is reached.

As described herein, the equipment can be protected based on its design limit. In addition, some transmission lines may be designed for higher windspeeds than other lines. For instance, the metal towers that support very high voltage lines may be designed for higher windspeeds (e.g., than older wooden power poles). Also, as lines and equipment age and become weakened, the setpoint may be lowered as needed (e.g., lower windspeeds may trigger a power disconnect for aged lines and equipment). Accordingly, fires or other damage or harm caused by failing electrical equipment during certain environmental conditions (e.g., high wind events, low humidity, etc.) may be prevented. Such techniques and equipment configurations may provide utilities a new tool to use to help prevent fires and save lives, property, resources, etc., more efficiently.

Figure 1:
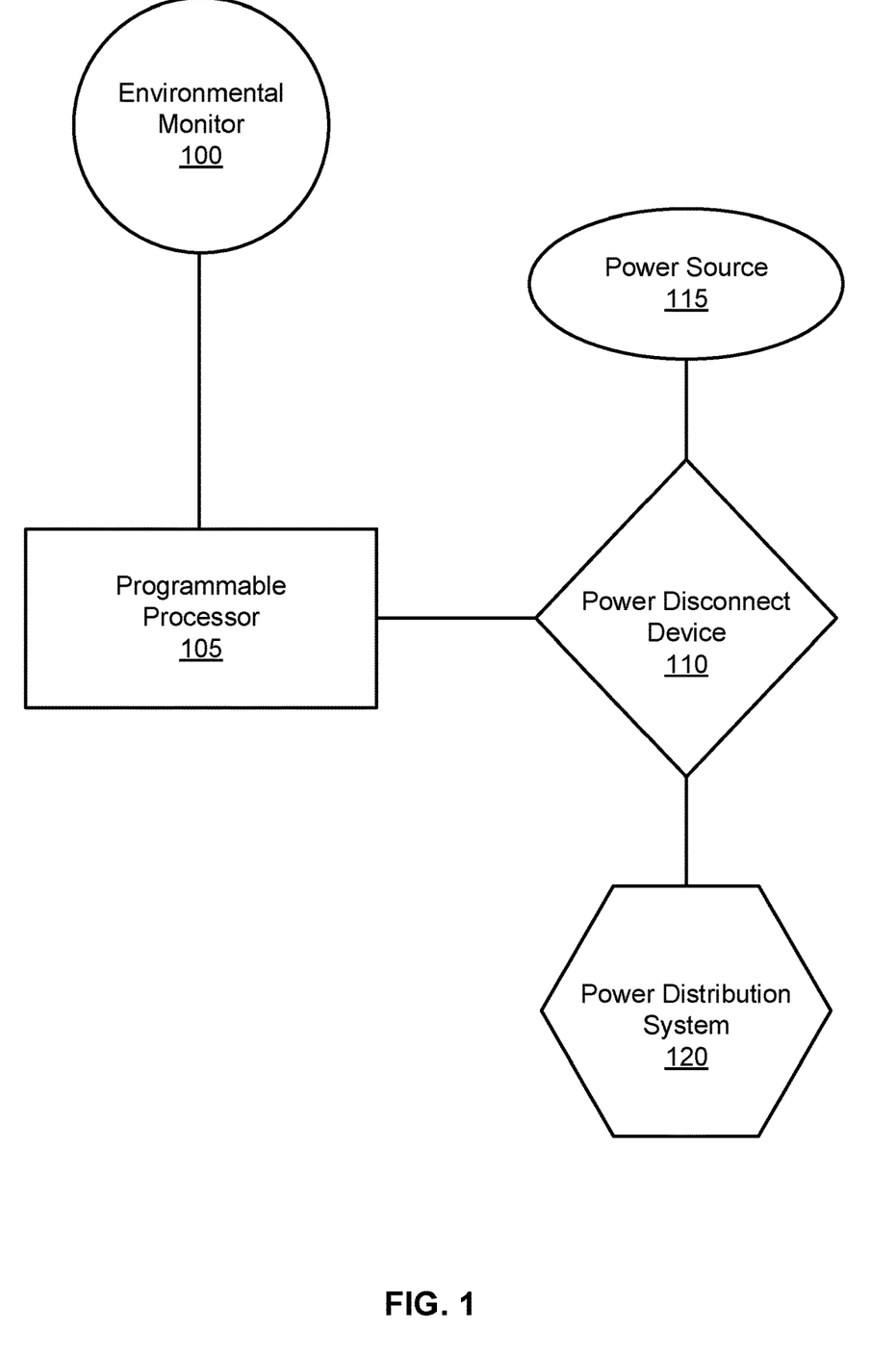
FIG. 1 shows a block diagram of an equipment control system according to aspects of the present disclosure.

FIG. 1 shows a block diagram of an equipment control system according to aspects of the present disclosure. The example shown includes environmental monitor 100, processor 105, power disconnect device 110, power source 115, and power distribution system 120.

Environmental monitor 100 monitors environmental conditions and the output is fed to programmable processor 105. The processor 105 may be programmed to provide a binary output (e.g., on/off) to the power disconnect device 110. Once a preprogrammed setpoint is reached as determined by the processor 105, the disconnect device 110 may receive the signal to actuate and the power would be turned off (e.g., deenergized) to the equipment and/or power lines that are protected by this scheme. In some cases, the environmental monitor 200 may not be in the same physical location of the power disconnect device 110 (e.g., and communications equipment may be implemented).

The example equipment control system of FIG. 1 may monitor environmental conditions (e.g., windspeed, humidity, rain, temperature, etc.) via environmental monitor 100. Environmental monitor 100 may pass (e.g., signal, send, transmit, etc.) measurement or condition information to processor 105. The processor 105 may determine whether to perform some power disconnect procedure based on analysis of the measurement or condition information. For instance, processor 105 may compare the measurement or condition information to some programmable setpoint or threshold (e.g., processor 105 may compare received windspeed to some threshold windspeed). In cases where some condition is met (e.g., where some value or measurement satisfies a power disconnect threshold), processor 105 may pass (e.g., signal, send, transmit, etc.) a power disconnect signal to power disconnect device 110, where power disconnect device 110 may disconnect power distribution system 120 from power source 115.

Accordingly, in some examples, example equipment control system of FIG. 1 may monitor windspeed and based on a predetermined programmable setpoint (windspeed), trip and deenergize downstream electrical distribution lines and equipment to prevent fires or other hazards from energized electrical lines and/or equipment coming into contact with non-intended items, such as vegetation or people. As discussed herein, other environmental sensors including heat or temperature sensors, humidity sensors, rain sensors, etc., may be used to enhance the ability of the windspeed monitoring system to adjust the windspeed setpoint or to make other system programming adjustments such as time delay or system override.

The example equipment control system may thus include windspeed monitoring sensors, temperature or heat monitoring sensors, humidity monitoring sensors, rain monitoring sensors, etc. (e.g., as further described herein, for example, with reference to FIG. 2). The system may include programmable devices (e.g., processor 105), power disconnect devices (e.g., power disconnect device 110), and other interfaces and communications equipment depending on implementation. In some cases the power disconnect device 110 may be in close proximity to the environmental monitoring sensors (e.g., environmental monitor 100) and hard wired, but in other cases the environmental sensors may be installed some distance from the power disconnect device 110 and a form of communication between components and/or devices may be implemented (e.g., such as via a transceiver, communication equipment 245, communication equipment 345, etc.).

In accordance with some examples, a programmable system (e.g., a programmable processor 105) may be implemented such that a specific windspeed setpoint (e.g., or other heat setpoints, temperature setpoints, etc.) can be selected. An environmental condition (e.g., wind, temperature, humidity) setpoint may generally refer to some condition or threshold set to trigger an action by the system (e.g., such as a power disconnect procedure). Programming may include input from other environmental sensors to adjust or override the windspeed setpoint as desired. Various transmission lines, electrical equipment, etc., may be designed to withstand certain environmental conditions such as maximum windspeeds, maximum temperature ratings, certain water resistances, etc. The programmable feature allows the windspeed and other environmental trip setpoints to be adjusted according to the design of the equipment. Just as different wire sizes may be capable of handling different amounts of electrical current and therefore may include a circuit breaker or fuse of a corresponding rating, transmission lines and associated equipment may be designed to handle different levels of maximum windspeed and would thus implement a corresponding sensor trip setpoint according to the techniques described herein.

The proposed system may protect against the consequences of electrical distribution equipment failure (e.g., transmission lines, electrical equipment, etc.) based on the exceeding equipment design limitations for windspeed. The equipment may still fail, but the consequences of the failure would be mitigated by having the equipment deenergized prior to or at the point of failure. As used herein, a disconnecting by the power disconnect device 110 of the power distribution system 120 from the power source 115 may generally refer to a power disconnect procedure, deenergizing equipment, etc. Such a procedure may include trip and deenergize downstream electrical distribution lines and equipment to prevent fires or other hazards from energized electrical lines and/or equipment.

In addition to protecting electrical equipment from a failure caused by high windspeeds, the programmable feature can also be set to deenergize electrical equipment at windspeeds that could cause adjacent trees and other structures that could contact electrical distribution components in extreme environmental events which could cause damage. The setpoint may be set at any value determined to be prudent to protect human life and/or property.

The described example equipment control system may thus protect against high windspeeds, however such systems may also be implemented to vary setpoints or triggering thresholds, time delay or other programming features based on the specific equipment employing the control system, based on other environmental conditions (e.g., such as temperature, humidity or rain accumulation), etc. For example, if local temperatures are high (e.g., above some threshold), or humidity is exceedingly low (e.g., below some threshold), then it may be prudent to lower the windspeed setpoint (e.g., such that the power disconnect procedure may be triggered more sensitively as fire risk may be higher). On the other hand, if it has been raining, and the fire danger is much lower, then the setpoint may be raised or the system could be disabled.

As described, environmental monitor 100 may include a windspeed sensor (e.g., an anemometer) that can measure windspeed and convert it to an electrical output so that the electrical output is proportional to the windspeed. Environmental monitor 100 may also include additional environmental sensors (e.g., temperature sensors, humidity sensors, etc.) that can monitor heat, humidity and rain to provide additional information to the programmable process for the purpose of changing programming variables such as windspeed trip setpoint, delay, system disable, other electrical output proportional to the measured condition, etc.

Processor 105 (e.g., a programmable processor) may include or refer to any programmable device that can take the electrical output from the windspeed sensor and additional environmental sensors and convert that information to a bi-stable output based on preprogrammed variables. In other words, once a specific windspeed or other extreme environmental condition is reached, the programmable device output may change states and provide an appropriate output to actuate downstream device(s).

Power disconnect device 110 may include or refer to any device that upon receiving the change of state from the programmable processor 105 can cause electrical equipment to become deenergized. In some case there will be a relay in between the actual breaker and the programmable processor. In other cases, the programmable processor may contain a relay. Various hardware can work together to provide the techniques described herein. The result being that upon a specific predetermined windspeed or other extreme environmental condition, electrical equipment is deenergized to protect life and/or property. The actual windspeed setpoint may be programmed to be adjusted based on other environmental conditions if desired. For example, after a period of rain, the windspeed setpoint may be increased as the fire danger has now been reduced.

Environmental monitor 100 is an example of, or includes aspects of, the corresponding element described with reference to FIG. 2. For instance, in some cases, other sensors such as heat or temperature sensors, humidity sensors, rain sensors, etc., may be used to provide additional input to the system to automatically adjust trip setpoint (e.g., a condition or threshold triggering a power disconnect procedure), time delay or system override as desired thereby creating a "smart" protection scheme.

According to some embodiments, processor 105 may be configured to receive the wind measurement signal from the wind sensor (e.g., wind sensor 205) and send the disconnect signal to the power disconnect device 110, wherein the system is configured to determine the wind measurement, send the wind measurement signal to the programmable processor 105, determine if the wind measurement signal exceeds a predetermined windspeed value, and send the disconnect signal to the power disconnect device 110 upon determining that the wind measurement signal exceeds the predetermined windspeed value, whereby the power distribution system 120 is disconnected from the power source 115.

According to some embodiments, processor 105 receives the wind measurement signal. In some examples, processor 105 determines if the wind measurement signal exceeds a predetermined windspeed value. In some examples, processor 105 sends a disconnect signal to a power disconnect device 110 in response to determining that the wind measurement signal exceeds the predetermined windspeed value. In some examples, the disconnecting from the power source 115 by the power disconnect device 110 of the power distribution system 120 includes activating a relay by the programmable processor 105.

In some examples, processor 105 determines if the temperature measurement signal exceeds a predetermined temperature value. In some examples, processor 105 sends the disconnect signal to the power disconnect device 110 upon determining that the temperature measurement signal exceeds the predetermined temperature value, whereby the power distribution system 120 is disconnected from the power source 115.

In some examples, processor 105 determines if the humidity measurement signal exceeds a predetermined humidity value. In some examples, processor 105 inhibits the sending of the disconnect signal to the power disconnect device 110 upon determining that the humidity measurement is above a predetermined humidity value, whereby the power distribution system 120 is not disconnected from the power source 115 when the humidity measurement is above the predetermined humidity value. In some examples, processor 105 determines if the humidity measurement signal exceeds a predetermined humidity value.

Processor 105 (e.g., which may be referred to as a programmable processor) is an example of, or includes aspects of, the corresponding element described with reference to FIG. 2. A processor 105 is an intelligent hardware device, (e.g., a general-purpose processing component, a digital signal processor 105 (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor 105 is configured to operate a memory array using a memory controller. In other cases, a memory controller is integrated into the processor 105. In some cases, the processor 105 is configured to execute computer-readable instructions stored in a memory to perform various functions. In some embodiments, a processor 105 includes special purpose components for modem processing, baseband processing, digital signal processing, or transmission processing.

According to some embodiments, power disconnect device 110 may be coupled to the power source 115 and the power distribution system 120, wherein the power disconnect device 110 is configured to disconnect the power source 115 from the power distribution system 120 upon receiving a disconnect signal. According to some embodiments, power disconnect device 110 disconnects from the power source 115 by the power disconnect device 110 of the power distribution system 120 in response to receiving the disconnect signal. Power source 115 is an example of, or includes aspects of, the corresponding element described with reference to FIG. 2.

In some examples, any of environmental monitor 100, processor 105, power disconnect device 110, power source 115, and power distribution system 120 may include or utilize an IO controller, a transceiver, a database, etc., to perform one or more of the functions described herein.

An IO controller may manage input and output signals for a device. IO controller may also manage peripherals not integrated into a device. In some cases, an IO controller may represent a physical connection or port to an external peripheral. In some cases, an IO controller may utilize an operating system such as iOS®, ANDROID®, MS-DOS®, MS-WINDOWS®, OS/2®, UNIX®, LINUX®, or another known operating system. In other cases, an IO controller may represent or interact with a modem, a keyboard, a mouse, a touchscreen, or a similar device. In some cases, an IO controller may be implemented as part of a processor 105. In some cases, a user may interact with a device via IO controller or via hardware components controlled by an IO controller.

A transceiver may communicate bi-directionally, via antennas, wired, or wireless links as described above. For example, the transceiver may represent a wireless transceiver and may communicate bi-directionally with another wireless transceiver. The transceiver may also include or be connected to a modem to modulate the packets and provide the modulated packets for transmission, and to demodulate received packets. In some examples, transceiver may be tuned to operate at specified frequencies. For example, a modem can configure the transceiver to operate at a specified frequency and power level based on the communication protocol used by the modem.

In some examples, the system may also include a database for storing data. A database is an organized collection of data. For example, a database stores data in a specified format known as a schema. A database may be structured as a single database, a distributed database, multiple distributed databases, or an emergency backup database. In some cases, a database controller may manage data storage and processing in a database. In some cases, a user interacts with database controller. In other cases, database controller may operate automatically without user interaction.

Figure 2:
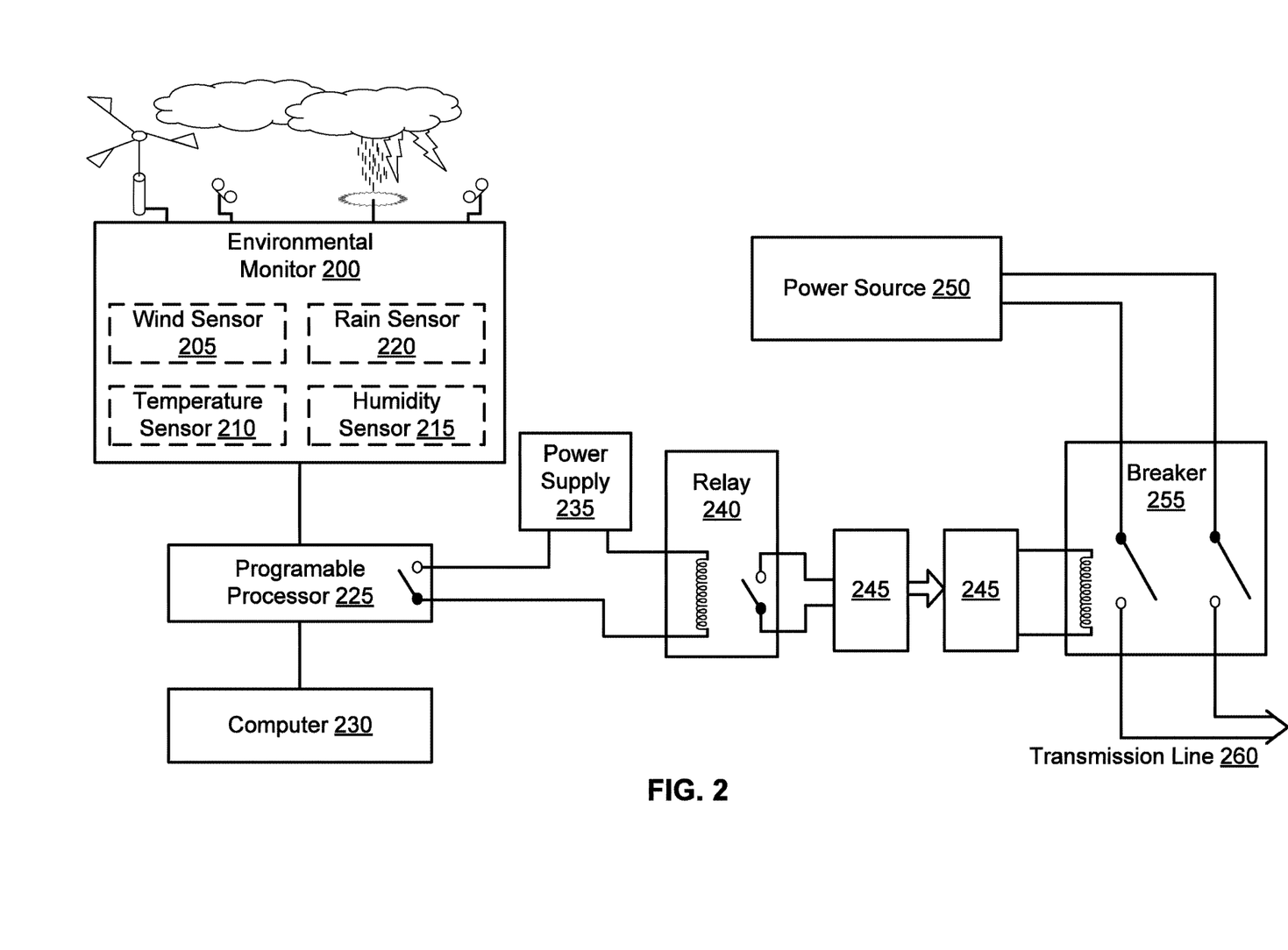
FIG. 2 shows a schematic of an equipment control system according to aspects of the present disclosure.

FIG. 2 shows a schematic of an equipment control system according to aspects of the present disclosure. The example shown includes environmental monitor 200, processor 225, computer 230, power supply 235, relay 240, communication equipment 245, power source 250, breaker 255, and transmission line 260. In some cases, the example equipment control system of FIG. 2 may include, illustrate, implement, etc., one or more aspects of the example equipment control system of FIG. 1.

As described, an equipment control system (e.g., of FIGS. 1 and/or 2) may include a variety of components, devices, sensors, etc., connected together to perform aspects of the techniques described herein. The techniques described herein may provide a method to automatically deenergize electrical equipment and/or power lines due to a high wind event thereby mitigating the possible danger to human life and/or property which would be caused by compromised electrical power lines and/or equipment.

Environmental monitor 200 is an example of, or includes aspects of, the corresponding element described with reference to FIG. 1. In one embodiment, environmental monitor 200 includes at least one of a wind sensor 205, temperature sensor 210, humidity sensor 215, and a rain sensor 220. In some embodiments, multiple sensors may be used. However, these sensors are only examples, and other sensors may also be used.

According to some embodiments, wind sensor 205 may be configured to determine a wind measurement and send a wind measurement signal indicating the wind measurement. In some examples, the wind measurement is windspeed. According to some embodiments, wind sensor 205 measures a wind measurement. In some examples, wind sensor 205 sends a wind measurement signal indicating the wind measurement. In some examples, the measuring, by the wind sensor 205, of the wind measurement includes measuring windspeed.

According to some embodiments, temperature sensor 210 may be configured to determine a temperature measurement and send a temperature measurement signal indicating the temperature measurement, wherein the programmable processor 225 is further configured to receive the temperature measurement signal from the temperature sensor 210 and send the disconnect signal to the power disconnect device, wherein the system is configured to determine the temperature measurement, send the temperature measurement signal to the programmable processor 225, which may determine if the temperature measurement exceeds a predetermined temperature value, and send the disconnect signal to the power disconnect device upon determining that the temperature measurement exceeds the predetermined temperature value, whereby the power distribution system is disconnected from the power source 250.

In some examples, humidity sensor 215 may be configured to determine a humidity measurement and send a humidity measurement signal indicating the humidity measurement, wherein the programmable processor 225 is further configured to receive the humidity measurement signal from the humidity sensor 215, wherein the system is configured to determine the humidity measurement or a temperature measurement, send the measurement signal to the programmable processor 225, and determine the predetermined windspeed value as a function of the measurement, wherein the predetermined windspeed value is increased when the humidity measurement increases. Additionally, or alternatively, the predetermined windspeed value is decreased when the temperature measurement increases.

According to some embodiments, the programmable processor 225 is further configured to receive the humidity measurement signal from the humidity sensor 215 and send the disconnect signal to the power disconnect device, wherein the system is configured to determine the humidity measurement, send the humidity measurement signal to the programmable processor 225, determine if the humidity measurement is above a predetermined humidity value; and inhibit the sending of the disconnect signal to the power disconnect device upon determining that the humidity measurement is above the predetermined humidity value, whereby the power distribution system is not disconnected from the power source 250 when the humidity measurement is above the predetermined humidity value.

In some examples, the programmable processor 225 may inhibit the sending of the disconnect signal to the power disconnect device upon determining that the humidity measurement is above the predetermined humidity value, whereby the power distribution system is not disconnected from the power source 250 when the humidity measurement is above the predetermined humidity value. In some examples, the programmable processor 225, may inhibit the sending of the disconnect signal to the power disconnect device upon determining that the humidity measurement is above the predetermined temperature value, whereby the power distribution system is not disconnected from the power source 250 when the humidity measurement is above the predetermined temperature value.

Thus, according to some embodiments, humidity sensor 215 determines a humidity measurement. In some examples, humidity sensor 215 generates a humidity measurement signal in response to the humidity measurement having been determined. In some examples, humidity sensor 215 sends the humidity measurement signal to the programmable processor 225. In some examples, humidity sensor 215 determines a humidity measurement. In some examples, humidity sensor 215 generates a humidity measurement signal in response to the humidity measurement having been determined. In some examples, humidity sensor 215 sends the humidity measurement signal to the programmable processor 225.

Processor 225 is an example of, or includes aspects of, the corresponding element described with reference to FIG. 1.

According to some embodiments, relay 240 may be directly coupled to the programmable processor 225, wherein the sending of the disconnect signal further comprises activating of the relay 240 by the programmable processor 225.

According to some embodiments, communication equipment 245 may be configured to relay the wind measurement signal from the wind sensor 205 to the programmable processor 225. In some examples, communication equipment 245 may be configured to relay the disconnect signal from the programmable processor 225 to the power disconnect device. According to some embodiments, communication equipment 245 relays the wind measurement signal from the wind sensor 205 to the programmable processor 225 via communication equipment 245. In some examples, communication equipment 245 relays the disconnect signal from the programmable processor 225 to the power disconnect device via communication equipment 245. In some cases, communication equipment 245 may include a transceiver.

Communication equipment 245 may depend on specific field implementation (e.g., on certain electrical equipment, location of electrical equipment, local weather patterns, electrical equipment accessibility, micro-weather trends, etc.). Communication equipment 245 may or may not be implemented depending on such or similar factors. For example, if the windspeed sensor 205 or other environmental sensors are in close proximity to the power disconnect device (e.g., breaker 255) then a direct hard wire connection can be made, but if for example the sensors are not at the same location, then communication equipment 245 may be implemented to transmit or signal the desired information. If communication equipment 245 is between the processor 225 and the relay 240, then the communication signal will transmit the actuation signal, but if communication equipment 245 is between the sensor (e.g., environmental monitor 200) and the processor 225, then the communication equipment 245 may transmit the proportion electrical signal associated with the environmental condition of concern. Inclusion of communication equipment 245 may be based on field conditions and may not impact the concept of disconnecting power based on a predetermined environmental condition to protect life and/or property.

The detailed schematic provided in FIG. 2 is only one optional implementation. Variations will be implemented by analogy depending on field characteristics (e.g., such as electrical devices, weather, accessibility, available resources, etc.). Some variation may be centered around communication resources depending on if the environmental sensor(s) are in close proximity to the power disconnect device or if the relay 240 is part of or separate from the power disconnect device (e.g., if the relay 240 is part of or separate from breaker 255). In addition, the programmable processor 225 may or may not be part of the relay 240 or a stand-alone device. In other words, one or more aspects may be varied or altered to implement the techniques described herein, including techniques for disconnecting power to protect life and or property from electrical lines and or electrical equipment that have been or will be damaged or compromised due to an extreme environmental event such as an earthquake, landslide, heat, or high wind event.

As described herein, in some examples, environmental monitor 200 may include a wind sensor 205 (e.g., an anemometer) and various other environmental sensors (e.g., such as temperature sensor 210, humidity sensor 215, and rain sensor 220). Wind sensor 205 (e.g., an anemometer) may sense windspeed and provide an electrical output which varies with windspeed. The use of the anemometer may be by itself or along with other environmental sensors. Environmental sensors (e.g., temperature sensor 210, humidity sensor 215, and rain sensor 220) may be implemented to measure additional environmental conditions to provide additional information to the programmable processor 225. The additional environmental conditions could be used to vary the setpoint of the windspeed monitor (e.g., the wind sensor 205). In times of low humidity when fire danger is high, the windspeed setpoint may be lowered, but in times of rainy conditions when the fire danger is lower, the windspeed setpoint may be raised.

In some cases, wind sensor 205 may be a cup version or a version that includes no moving parts. A windspeed sensor 205 may be implemented that can provide an output which is proportional to windspeed. In some examples, the wind sensor 205 may produce 4-20 ma current output where 4 ma is zero windspeed and 20 ma is full scale windspeed. Full scale windspeed may be programmable and, in some cases, may be set higher than the highest anticipated windspeed. The actual setpoints may be determined by field conditions or the electrical equipment that may be subject to damage. A temperature sensor 210 may be added along with the wind sensor 205 and the two sensors may be used together. In some examples, such environmental sensors may have a proportional output according to the measurement being made. The programmable processor 225 may be set accordingly to provide the desired protection.

Temperature sensor 210 may measure local heat and provide an electrical output corresponding to localized heat. Local high heat may be due to approaching fire. In addition, the local temperature may be used to vary the setpoint of the windspeed monitor which may occur during extreme summer temperatures. For instance, in some examples, the windspeed setpoint may be lowered during these times. Temperature sensor 210 may be implemented or used by itself or along with the wind sensor 205 (e.g., the anemometer).

Processor 225 may include a programmable device which can sense the output of environmental monitor 200 (e.g., an anemometer and/or other environmental sensors) and provide an action once a preprogrammed setpoint is reached. The processor 225 may be stand alone or part of an existing device. The action can be a contact closure or a stimulus to communications equipment 245. As in the proof of concept design, a Moore module (Moore industries CPT module) may be used as the programmable processor 225 and a laptop computer may be temporarily connected to the Moore module for setpoint and configuration programming via a serial port. Various other implementations are considered by analogy, without departing from the scope of the present disclosure.

In some examples, processor 225 may include, as a non-limiting example, a Moore "Computer Programmable Alarm" (CPA) by Moore Industries. Model number CPA/HLPRG. This unit is programmable using Moore Industries software application from any computer that may output through a serial port to the COM port on the front of the Moore module. Many electrical switch gear relays may be programmable and, in the case where a programmable relay is used, a stand-alone programmable processor may not be needed as the programmable relay may be performing the programmable function.

Computer 230 may be any computer (e.g., a computer that can run the programming software of the processor 225 and output through a serial port). In the example of FIG. 2, the computer 230 may be separate than that of the programmable processor 225. If a programmable relay is used to take the place of the programmable processor 225 then the programming may be performed using front panel dials. At some point, a single device may be designed to include the programmable processor 225, relay 240, and signal conversion all in one. The described techniques include any implementation where all the components work together to provide one or more aspects described herein. In some examples, the temperature sensor 210 may be used to adjust windspeed setpoint or may be used by itself to monitor high heat conditions such as an oncoming fire and deenergize electrical equipment accordingly.

Power supply 235 may include any power supply implemented to actuate a relay 240. The contacts of the implemented module may be dry, meaning they are just contacts which are either open or closed and no current would flow without an external power supply 235.

Relay 240 and power disconnect device (e.g., breaker 255) may be single or separate devices that can receive a signal from the programmable processor 225 and in turn disconnect power to downstream electrical devices and/or power lines. The signal may be hard wired or through communications equipment 245. Communication equipment 245 may include any devices to transmit a signal (e.g., from the anemometer to the breaker), such as a transceiver or other communication equipment. Communication equipment 245 may be implemented at any time along the signal path. Relay 240 may include a basic relay that a current flowing in the coil will "pull-in" the contacts to actuate a downstream device.

Power source 250 is an example of, or includes aspects of, the corresponding element described with reference to FIG. 1.

Breaker 255 may include a power disconnect device (e.g., a power disconnect device 110) or possible a new one added to the power distribution system (e.g., to the power distribution system 120). The breaker 255 may trip open on a variety of input signals or, in some cases, may only respond to the pre-programmed environmental event. As the Electrical Grid is reevaluated for fire prevention due to wind events, the grid may be broken up into smaller sections so that when a wind event occurs transmission lines and power supply equipment may be turned off, smaller areas are impacted thus reducing the number of loads (customers) that would be impacted by the power "outage". According to the techniques described herein, smaller areas may be down powered due to actual real time events as opposed to predictions.

Depending on the implementation of the techniques described herein, variations of one or more aspects of the described techniques may be implemented. For instance, implementation may be such that a relay 240 is included between the processor 225 and breaker 255. It may be that the relay 240 and breaker 255 are combined in an existing device. Other variations may implement the use of communications equipment 245 (e.g., to transmit the anemometer output or other environmental sensor outputs to the processor 225, from the processor 255 to the relay 240 and breaker 255, etc.). The techniques described herein may be implemented for a wind sensor 205 (e.g., an anemometer) that is wired or wireless and connected in such a way to deenergize electrical equipment for the purpose of fire or personal safety due to a high wind event.

The techniques described herein may be implemented to mitigate, reduce, detect, etc., any electrically caused fire or other electrically caused damage due to a high wind event or other severe environmental conditions such as earthquake, landslide, heat or human action such as a car impact with a power pole, etc.

Figure 3:
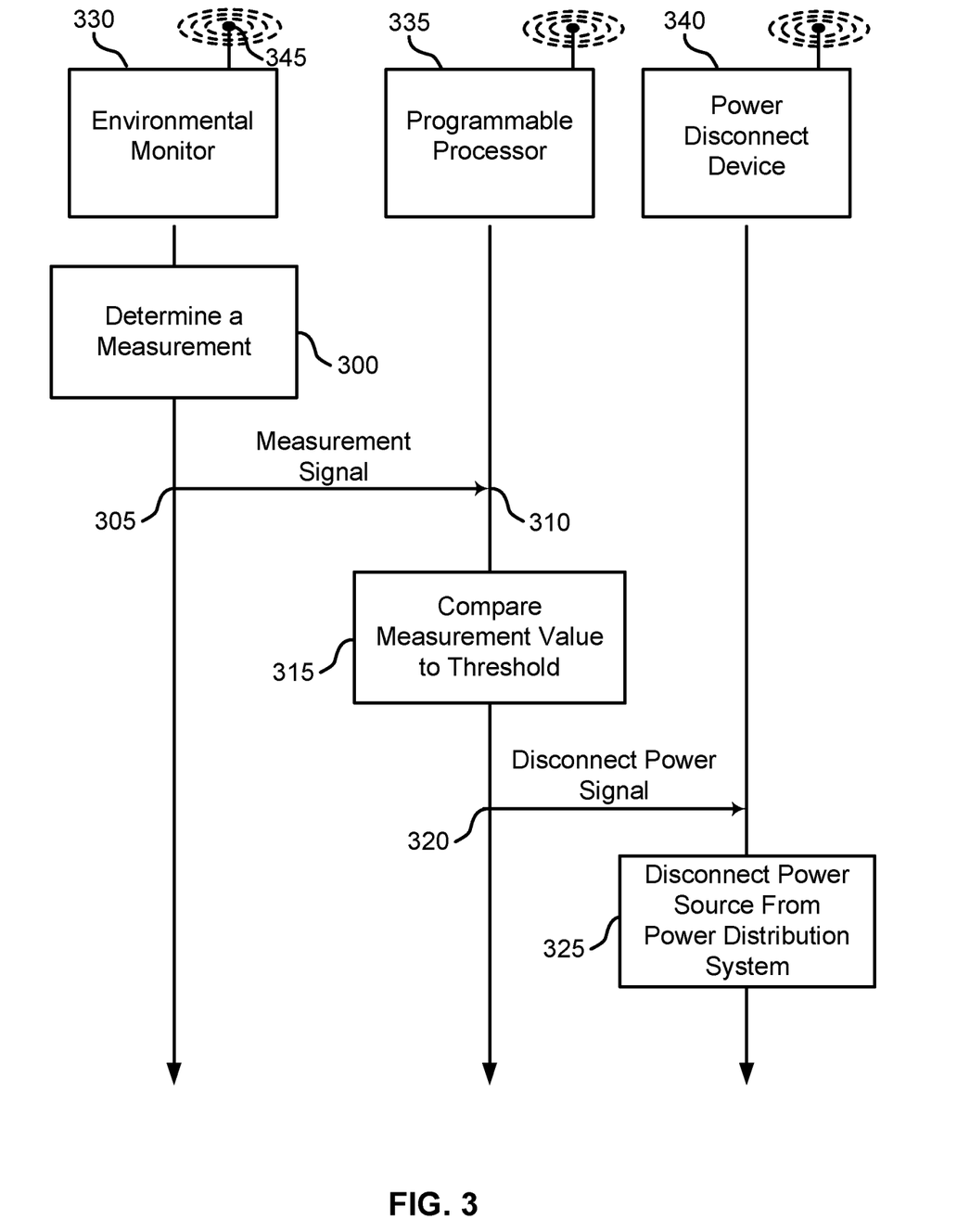
FIG. 3 shows an example of a process for disconnecting a power distribution system from a power source according to aspects of the present disclosure.

FIG. 3 shows an example of a process for disconnecting a power distribution system from a power source according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 300, the environmental monitor 330 performs (e.g., or determines, sense, etc.) a measurement. For example, the measurement could be a windspeed measurement, a humidity measurement, or both. In some cases, the operations of this step refer to, or are performed by, a wind sensor or a humidity as described with reference to FIG. 2.

At operation 305, the environmental monitor 330 sends a measurement signal to the programmable processor 335 indicating the measurement. In some cases, the operations of this step refer to, or are performed by, a wind sensor or a humidity sensor as described with reference to FIG. 2.

At operation 310, the programmable processor 335 receives the measurement signal. In some cases, the operations of this step refer to, or are performed by, a processor as described with reference to FIGS. 1 and 2.

At operation 315, the programmable processor 335 determines if the measurement signal exceeds a predetermined value. In some cases, the operations of this step refer to, or are performed by, a processor as described with reference to FIGS. 1 and 2.

At operation 320, the programmable processor 335 sends a disconnect signal to a power disconnect device 340. In some cases, the operations of this step refer to, or are performed by, a processor as described with reference to FIGS. 1 and 2.

At operation 325, the power disconnect device 340 disconnects the power distribution system from the power source. In some cases, the operations of this step refer to, or are performed by, a power disconnect device as described with reference to FIG. 1.

As described, in some cases, some or all of environmental monitor 330, programmable processor 335, and power disconnect device 340, may include communication equipment 345 dependent on implementation. Communication equipment 345 may be an example of, or includes aspects of, the corresponding element described with reference to FIG. 2. In other cases, none of environmental monitor 330, programmable processor 335, and power disconnect device 340, may include communication equipment 345.

Figure 4:
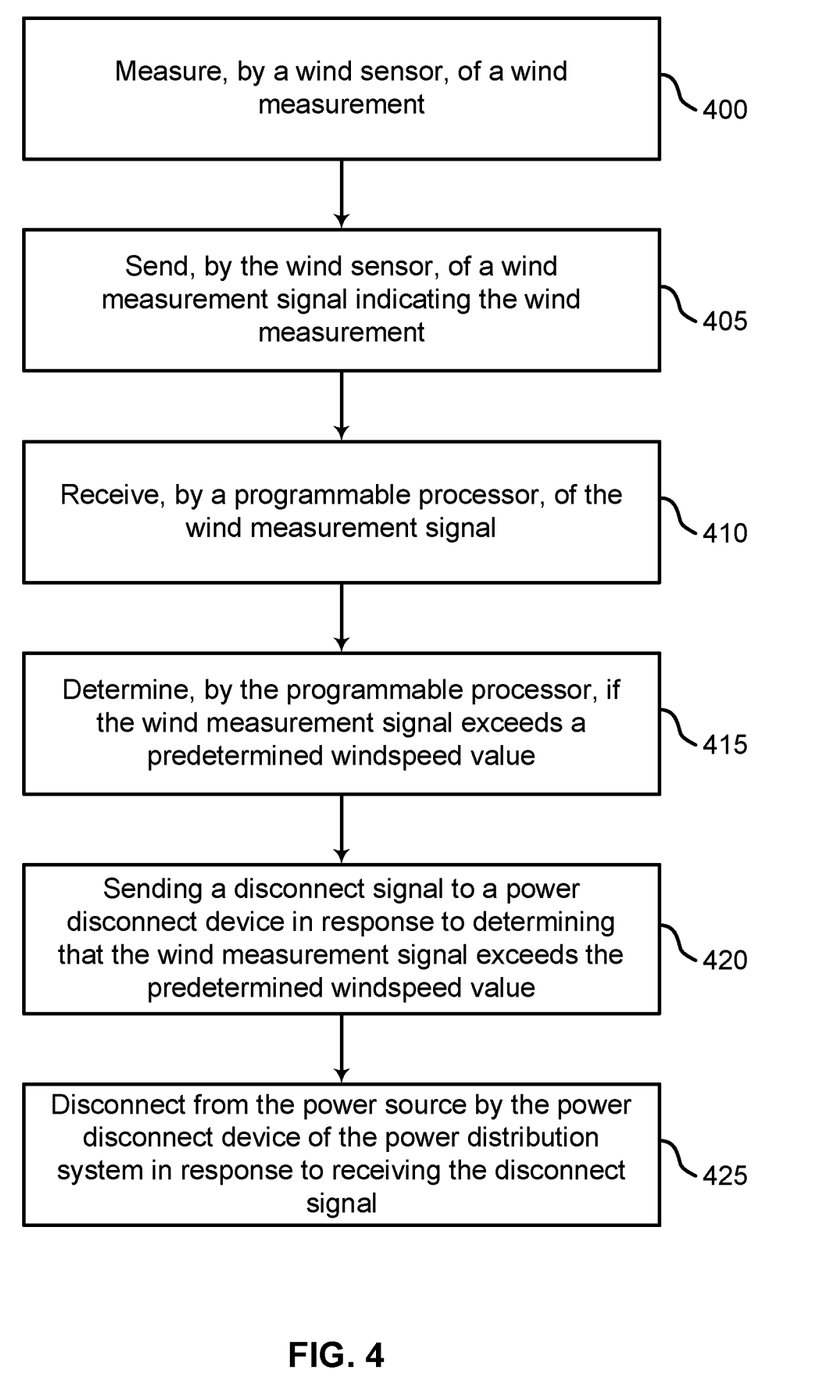
FIG. 4 shows an example of a process for disconnecting a power distribution system from a power source based on a wind measurement according to aspects of the present disclosure.

FIG. 4 shows an example of a process for disconnecting a power distribution system from a power source based on a wind measurement according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various sub steps or are performed in conjunction with other operations.

At operation 400, the system measures, by a wind sensor, a wind measurement. In some cases, the operations of this step refer to, or are performed by, a wind sensor as described with reference to FIG. 2.

At operation 405, the system sends, by the wind sensor, a wind measurement signal indicating the wind measurement. In some cases, the operations of this step refer to, or are performed by, a wind sensor as described with reference to FIG. 2.

At operation 410, the system receives, by a programmable processor, the wind measurement signal. In some cases, the operations of this step refer to, or are performed by, a processor as described with reference to FIGS. 1 and 2.

At operation 415, the system determines, by the programmable processor, if the wind measurement signal exceeds a predetermined windspeed value. In some cases, the operations of this step refer to, or are performed by, a processor as described with reference to FIGS. 1 and 2.

At operation 420, the system sends a disconnect signal to a power disconnect device in response to determining that the wind measurement signal exceeds the predetermined windspeed value. In some cases, the operations of this step refer to, or are performed by, a processor as described with reference to FIGS. 1 and 2.

At operation 425, the system disconnects from the power source (e.g., by the power disconnect device of the power distribution system) in response to receiving the disconnect signal. In some cases, the operations of this step refer to, or are performed by, a power disconnect device as described with reference to FIG. 1.

Figure 5:
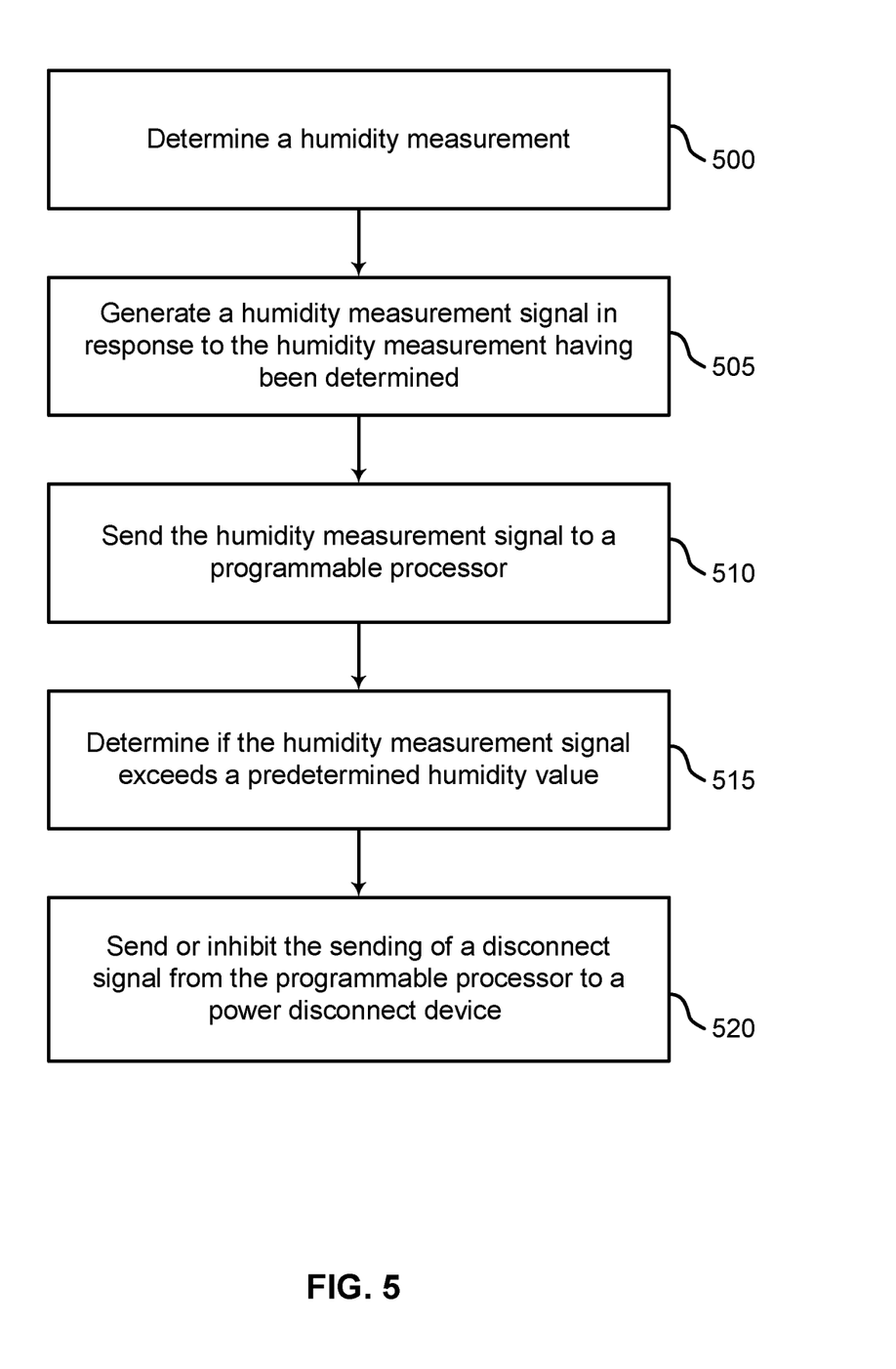
FIG. 5 shows an example of a process for disconnecting a power distribution system from a power source based on a humidity measurement according to aspects of the present disclosure.

FIG. 5 shows an example of a process for disconnecting a power distribution system from a power source based on a humidity measurement according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various sub steps or are performed in conjunction with other operations.

At operation 500, the system determines a humidity measurement. In some cases, the operations of this step refer to, or are performed by, a humidity sensor as described with reference to FIG. 2.

At operation 505, the system generates a humidity measurement signal in response to the humidity measurement having been determined. In some cases, the operations of this step refer to, or are performed by, a humidity sensor as described with reference to FIG. 2.

At operation 510, the system sends the humidity measurement signal to a programmable processor. In some cases, the operations of this step refer to, or are performed by, a humidity sensor as described with reference to FIG. 2.

At operation 515, the system determines if the humidity measurement signal exceeds a predetermined humidity value. In some cases, the operations of this step refer to, or are performed by, a processor as described with reference to FIGS. 1 and 2.

At operation 520, the system sends or inhibits the sending of a disconnect signal from the programmable processor to a power disconnect device based on the humidity measurement signal exceeding the predetermined humidity value. For example, the system inhibits the sending of a disconnect signal from the programmable processor to a power disconnect device upon determining that the humidity measurement is above the predetermined humidity value, whereby a power distribution system is not disconnected from a power source when the humidity measurement is above the predetermined humidity value. In some cases, the operations of this step refer to, or are performed by, a processor as described with reference to FIGS. 1 and 2.

Figure 6:
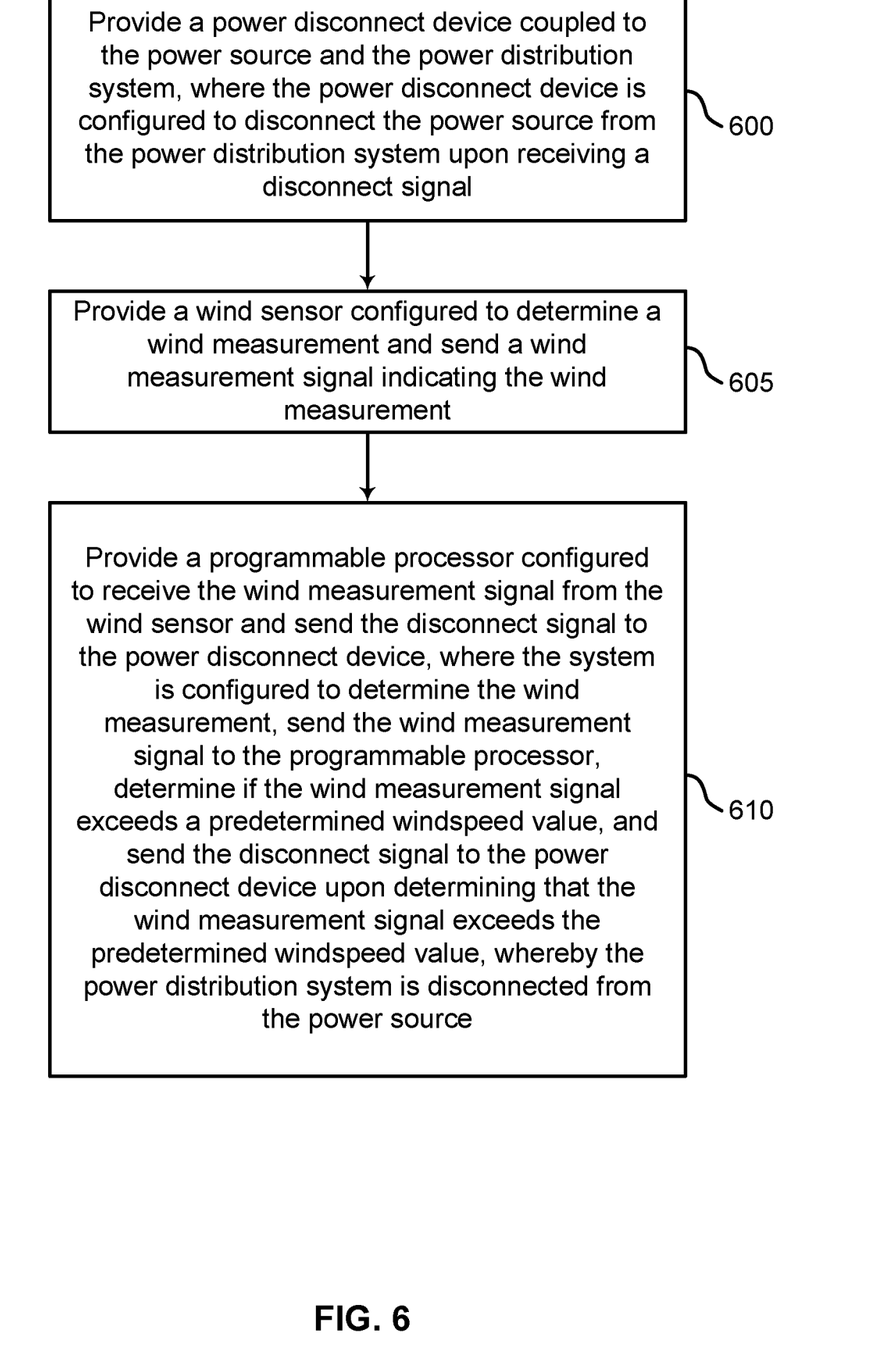
FIG. 6 show examples of a process for manufacturing a system for disconnecting a power distribution system from a power source according to aspects of the present disclosure.

FIG. 6 shows an example of a process for manufacturing a system for disconnecting a power distribution system from a power source according to aspects of the present disclosure. In some examples, these operations are performed by a manufacturing system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 600, the manufacturing system provides a power disconnect device coupled to the power source and the power distribution system, where the power disconnect device is configured to disconnect the power source from the power distribution system upon receiving a disconnect signal. In some cases, the operations of this step refer to a power disconnect device as described with reference to FIG. 1.

At operation 605, the manufacturing system provides a wind sensor configured to determine a wind measurement and send a wind measurement signal indicating the wind measurement. In some cases, the operations of this step refer to a wind sensor as described with reference to FIG. 2.

At operation 610, the manufacturing system provides a programmable processor configured to receive the wind measurement signal from the wind sensor and send the disconnect signal to the power disconnect device, where the system is configured to determine the wind measurement, send the wind measurement signal to the programmable processor, determine if the wind measurement signal exceeds a predetermined windspeed value, and send the disconnect signal to the power disconnect device upon determining that the wind measurement signal exceeds the predetermined windspeed value, whereby the power distribution system is disconnected from the power source. In some cases, the operations of this step refer to, a processor as described with reference to FIGS. 1 and 2.

Accordingly, the present disclosure includes at least the following embodiments.

An apparatus for disconnecting a power distribution system from a power source is described. Embodiments of the apparatus include a power disconnect device coupled to the power source and the power distribution system, wherein the power disconnect device is configured to disconnect the power source from the power distribution system upon receiving a disconnect signal, a wind sensor configured to determine a wind measurement and send a wind measurement signal indicating the wind measurement, and a programmable processor configured to receive the wind measurement signal from the wind sensor and send the disconnect signal to the power disconnect device, wherein the system is configured to determine the wind measurement, send the wind measurement signal to the programmable processor, determine if the wind measurement signal exceeds a predetermined windspeed value, and send the disconnect signal to the power disconnect device upon determining that the wind measurement signal exceeds the predetermined windspeed value, whereby the power distribution system is disconnected from the power source.

A system for disconnecting a power distribution system from a power source is described. The system includes a power disconnect device coupled to the power source and the power distribution system, wherein the power disconnect device is configured to disconnect the power source from the power distribution system upon receiving a disconnect signal, a wind sensor configured to determine a wind measurement and send a wind measurement signal indicating the wind measurement, and a programmable processor configured to receive the wind measurement signal from the wind sensor and send the disconnect signal to the power disconnect device, wherein the system is configured to determine the wind measurement, send the wind measurement signal to the programmable processor, determine if the wind measurement signal exceeds a predetermined windspeed value, and send the disconnect signal to the power disconnect device upon determining that the wind measurement signal exceeds the predetermined windspeed value, whereby the power distribution system is disconnected from the power source.

A method of manufacturing an apparatus for disconnecting a power distribution system from a power source is described. The method includes a power disconnect device coupled to the power source and the power distribution system, wherein the power disconnect device is configured to disconnect the power source from the power distribution system upon receiving a disconnect signal, a wind sensor configured to determine a wind measurement and send a wind measurement signal indicating the wind measurement, and a programmable processor configured to receive the wind measurement signal from the wind sensor and send the disconnect signal to the power disconnect device, wherein the system is configured to determine the wind measurement, send the wind measurement signal to the programmable processor, determine if the wind measurement signal exceeds a predetermined windspeed value, and send the disconnect signal to the power disconnect device upon determining that the wind measurement signal exceeds the predetermined windspeed value, whereby the power distribution system is disconnected from the power source.

Some examples of the apparatus, system, and method described above further include communication equipment configured to relay the wind measurement signal from the wind sensor to the programmable processor.

Some examples of the apparatus, system, and method described above further include communication equipment configured to relay the disconnect signal from the programmable processor to the power disconnect device.

In some examples, the wind measurement is windspeed.

Some examples of the apparatus, system, and method described above further include a relay directly coupled to the programmable processor, wherein the sending of the disconnect signal further comprises activating of the relay by the programmable processor.

Some examples of the apparatus, system, and method described above further include a temperature sensor configured to determine a temperature measurement and send a temperature measurement signal indicating the temperature measurement, wherein the programmable processor is further configured to receive the temperature measurement signal from the temperature sensor and send the disconnect signal to the power disconnect device, wherein the system is configured to determine the temperature measurement, send the temperature measurement signal to the programmable processor, determine if the temperature measurement exceeds a predetermined temperature value, and send the disconnect signal to the power disconnect device upon determining that the temperature measurement exceeds the predetermined temperature value, whereby the power distribution system is disconnected from the power source.

Some examples of the apparatus, system, and method described above further include a humidity sensor configured to determine a humidity measurement and send a humidity measurement signal indicating the humidity measurement, wherein the programmable processor is further configured to receive the humidity measurement signal from the humidity sensor and send the disconnect signal to the power disconnect device, wherein the system is configured to determine the humidity measurement, send the humidity measurement signal to the programmable processor, determine if the humidity measurement is above a predetermined humidity value, and inhibit the sending of the disconnect signal to the power disconnect device upon determining that the humidity measurement is above the predetermined humidity value, whereby the power distribution system is not disconnected from the power source when the humidity measurement is above the predetermined humidity value.

Some examples of the apparatus, system, and method described above further include a humidity sensor configured to determine a humidity measurement and send a humidity measurement signal indicating the humidity measurement, wherein the programmable processor is further configured to receive the humidity measurement signal from the humidity sensor, wherein the system is configured to determine the humidity measurement, send the humidity measurement signal to the programmable processor, and determine the predetermined windspeed value as a function of the humidity measurement, wherein the predetermined windspeed value is increased when the humidity measurement increases.

Some examples of the apparatus, system, and method described above further include a temperature sensor configured to determine a temperature measurement and send a temperature measurement signal indicating the temperature measurement, wherein the programmable processor is further configured to receive the temperature measurement signal from the temperature sensor, wherein the system is configured to determine the temperature measurement, send the temperature measurement signal to the programmable processor, and determine the predetermined windspeed value as a function of the temperature measurement, wherein the predetermined windspeed value is decreased when the temperature measurement increases.

A method for disconnecting a power distribution system from a power source is described. Embodiments of the method include measuring, by a wind sensor, of a wind measurement, sending, by the wind sensor, of a wind measurement signal indicating the wind measurement, receiving, by a programmable processor, of the wind measurement signal, determining, by the programmable processor, if the wind measurement signal exceeds a predetermined windspeed value, sending a disconnect signal to a power disconnect device in response to determining that the wind measurement signal exceeds the predetermined windspeed value, and disconnecting from the power source by the power disconnect device of the power distribution system in response to receiving the disconnect signal.

An apparatus for disconnecting a power distribution system from a power source is described. The apparatus includes a processor, memory in electronic communication with the processor, and instructions stored in the memory. The instructions are operable to cause the processor to measure, by a wind sensor, of a wind measurement, sending, by the wind sensor, of a wind measurement signal indicating the wind measurement, receiving, by a programmable processor, of the wind measurement signal, determining, by the programmable processor, if the wind measurement signal exceeds a predetermined windspeed value, sending a disconnect signal to a power disconnect device in response to determining that the wind measurement signal exceeds the predetermined windspeed value, and disconnecting from the power source by the power disconnect device of the power distribution system in response to receiving the disconnect signal.

A non-transitory computer readable medium storing code for disconnecting a power distribution system from a power source is described. In some examples, the code comprises instructions executable by a processor to: measuring, by a wind sensor, of a wind measurement, sending, by the wind sensor, of a wind measurement signal indicating the wind measurement, receiving, by a programmable processor, of the wind measurement signal, determining, by the programmable processor, if the wind measurement signal exceeds a predetermined windspeed value, sending a disconnect signal to a power disconnect device in response to determining that the wind measurement signal exceeds the predetermined windspeed value, and disconnecting from the power source by the power disconnect device of the power distribution system in response to receiving the disconnect signal.

Some examples of the method, apparatus, and non-transitory computer readable medium described above further include relaying the wind measurement signal from the wind sensor to the programmable processor via communication equipment. Some examples of the method, apparatus, and non-transitory computer readable medium described above further include relaying the disconnect signal from the programmable processor to the power disconnect device via communication equipment.

In some examples, the measuring, by the wind sensor, of the wind measurement comprises measuring windspeed. In some examples, the disconnecting from the power source by the power disconnect device of the power distribution system comprises activating a relay by the programmable processor.

Some examples of the method, apparatus, and non-transitory computer readable medium described above further include determining a temperature measurement. Some examples further include generating a temperature measurement signal in response to the temperature measurement having been determined. Some examples further include sending the temperature measurement signal to the programmable processor. Some examples further include determining if the temperature measurement signal exceeds a predetermined temperature value. Some examples further include sending the disconnect signal to the power disconnect device upon determining that the temperature measurement signal exceeds the predetermined temperature value, whereby the power distribution system is disconnected from the power source.

Some examples of the method, apparatus, and non-transitory computer readable medium described above further include determining a humidity measurement. Some examples further include generating a humidity measurement signal in response to the humidity measurement having been determined. Some examples further include sending the humidity measurement signal to the programmable processor. Some examples further include determining if the humidity measurement signal exceeds a predetermined humidity value. Some examples further include inhibiting the sending of the disconnect signal to the power disconnect device upon determining that the humidity measurement is above a predetermined humidity value, whereby the power distribution system is not disconnected from the power source when the humidity measurement is above the predetermined humidity value.

While the invention herein disclosed has been described by means of specific embodiments, examples and applications thereof, numerous modifications and variations could be made thereto by those skilled in the art without departing from the scope of the invention set forth in the claims.

What is claimed is:

1. A system for disconnecting a power distribution system from a power source, comprising:
   a power disconnect device coupled to the power source and the power distribution system, wherein the power disconnect device is configured to disconnect the power source from the power distribution system upon receiving a disconnect signal;
   a wind sensor configured to determine a wind measurement and send a wind measurement signal indicating the wind measurement;
   a programmable processor configured to receive the wind measurement signal from the wind sensor and send the disconnect signal to the power disconnect device; and
   a relay directly coupled to the programmable processor, wherein the sending of the disconnect signal further comprises activating of the relay by the programmable processor, wherein the system is configured to:
   determine the wind measurement;
   send the wind measurement signal to the programmable processor;
   determine if the wind measurement signal exceeds a predetermined windspeed value; and
   upon determining that the wind measurement signal exceeds the predetermined windspeed value, send the disconnect signal to the power disconnect device, whereby the power distribution system is disconnected from the power source.

2. A system for disconnecting a power distribution system from a power source, comprising:
   a power disconnect device coupled to the power source and the power distribution system, wherein the power disconnect device is configured to disconnect the power source from the power distribution system upon receiving a disconnect signal;
   a wind sensor configured to determine a wind measurement and send a wind measurement signal indicating the wind measurement;
   a programmable processor configured to receive the wind measurement signal from the wind sensor and send the disconnect signal to the power disconnect device; and
   a temperature sensor configured to determine a temperature measurement and send a temperature measurement signal indicating the temperature measurement, wherein said programmable processor is further configured to receive the temperature measurement signal from the temperature sensor and send the disconnect signal to the power disconnect device, wherein the system is configured to:
   determine the wind measurement;
   send the wind measurement signal to the programmable processor;
   determine if the wind measurement signal exceeds a predetermined windspeed value;
   upon determining that the wind measurement signal exceeds the predetermined windspeed value, send the disconnect signal to the power disconnect device, whereby the power distribution system is disconnected from the power source;
   determine the temperature measurement;
   send the temperature measurement signal to the programmable processor;
   determine if the temperature measurement exceeds a predetermined temperature value; and
   upon determining that the temperature measurement exceeds the predetermined temperature value, send the disconnect signal to the power disconnect device, whereby the power distribution system is disconnected from the power source.

3. A system for disconnecting a power distribution system from a power source, comprising:
   a power disconnect device coupled to the power source and the power distribution system, wherein the power disconnect device is configured to disconnect the power source from the power distribution system upon receiving a disconnect signal;
   a wind sensor configured to determine a wind measurement and send a wind measurement signal indicating the wind measurement;
   a programmable processor configured to receive the wind measurement signal from the wind sensor and send the disconnect signal to the power disconnect device; and
   a temperature sensor configured to determine a temperature further comprising a humidity sensor configured to determine a humidity measurement and send a humidity measurement signal indicating the humidity measurement, wherein said programmable processor is further configured to receive the humidity measurement signal from the humidity sensor and send the disconnect signal to the power disconnect device, wherein the system is configured to:

determine the humidity measurement;
send the humidity measurement signal to the programmable processor;
determine if the humidity measurement is above a predetermined humidity value;
determine the wind measurement;
send the wind measurement signal to the programmable processor;
determine if the wind measurement signal exceeds the predetermined windspeed value;
upon determining that the wind measurement signal exceeds the predetermined windspeed value and that the humidity measurement is not above the predetermined humidity value, send the disconnect signal to the power disconnect device, whereby the power distribution system is disconnected from the power source; and
upon determining that the wind measurement signal exceeds the predetermined windspeed value and that the humidity measurement is above the predetermined humidity value, inhibiting the sending of the disconnect signal to the power disconnect device, whereby the power distribution system is not disconnected from the power source when the humidity measurement is above the predetermined humidity value.

4. A system for disconnecting a power distribution system from a power source, comprising:
　a power disconnect device coupled to the power source and the power distribution system, wherein the power disconnect device is configured to disconnect the power source from the power distribution system upon receiving a disconnect signal;
　a wind sensor configured to determine a wind measurement and send a wind measurement signal indicating the wind measurement;
　a programmable processor configured to receive the wind measurement signal from the wind sensor and send the disconnect signal to the power disconnect device; and
　a humidity sensor configured to determine a humidity measurement and send a humidity measurement signal indicating the humidity measurement, wherein said programmable processor is further configured to receive the humidity measurement signal from the humidity sensor, wherein the system is configured to:
　determine the humidity measurement;
　send the humidity measurement signal to the programmable processor; and
　determine the predetermined windspeed value as a function of the humidity measurement, wherein the predetermined windspeed value is increased when the humidity measurement increases;
　determine the wind measurement;
　send the wind measurement signal to the programmable processor;
　determine if the wind measurement signal exceeds the predetermined windspeed value; and
　upon determining that the wind measurement signal exceeds the predetermined windspeed value, send the disconnect signal to the power disconnect device, whereby the power distribution system is disconnected from the power source.

5. A system for disconnecting a power distribution system from a power source, comprising:
　a power disconnect device coupled to the power source and the power distribution system, wherein the power disconnect device is configured to disconnect the power source from the power distribution system upon receiving a disconnect signal;
　a wind sensor configured to determine a wind measurement and send a wind measurement signal indicating the wind measurement;
　a programmable processor configured to receive the wind measurement signal from the wind sensor and send the disconnect signal to the power disconnect device; and
　a temperature sensor configured to determine a temperature measurement and send a temperature measurement signal indicating the temperature measurement, wherein said programmable processor is further configured to receive the temperature measurement signal from the temperature sensor, wherein the system is configured to:
　determine the temperature measurement;
　send the temperature measurement signal to the programmable processor; and
　determine the predetermined windspeed value as a function of the temperature measurement, wherein the predetermined windspeed value is decreased when the temperature measurement increases;
　determine the wind measurement;
　send the wind measurement signal to the programmable processor;
　determine if the wind measurement signal exceeds the predetermined windspeed value; and
　upon determining that the wind measurement signal exceeds the predetermined windspeed value, send the disconnect signal to the power disconnect device, whereby the power distribution system is disconnected from the power source.

6. A method for disconnecting a power distribution system from a power source, comprising:
　measuring, by a wind sensor, of a wind measurement;
　sending, by the wind sensor, of a wind measurement signal indicating the wind measurement;
　receiving, by a programmable processor, of the wind measurement signal;
　determining, by the programmable processor, if the wind measurement signal exceeds a predetermined windspeed value;
　in response to determining that the wind measurement signal exceeds the predetermined windspeed value, send a disconnect signal to a power disconnect device; and
　in response to receiving the disconnect signal, disconnecting by the power disconnect device of the power distribution system from the power source, wherein the disconnecting by the power disconnect device of the power distribution system from the power source comprises activating a relay by the programmable processor.

7. A method for disconnecting a power distribution system from a power source, comprising:
　measuring, by a wind sensor, of a wind measurement;
　sending, by the wind sensor, of a wind measurement signal indicating the wind measurement;
　receiving, by a programmable processor, of the wind measurement signal;
　determining, by the programmable processor, if the wind measurement signal exceeds a predetermined windspeed value;
　in response to determining that the wind measurement signal exceeds the predetermined windspeed value, send a disconnect signal to a power disconnect device;
　in response to receiving the disconnect signal, disconnecting by the power disconnect device of the power distribution system from the power source;

determining a temperature measurement;
generating a temperature measurement signal in response to the temperature measurement having been determined;
sending the temperature measurement signal to the programmable processor;
determining if the temperature measurement signal exceeds a predetermined temperature value; and
upon determining that the temperature measurement signal exceeds the predetermined temperature value, sending the disconnect signal to the power disconnect device, whereby the power distribution system is disconnected from the power source.

8. A method for disconnecting a power distribution system from a power source, comprising:
measuring, by a wind sensor, of a wind measurement;
sending, by the wind sensor, of a wind measurement signal indicating the wind measurement;
receiving, by a programmable processor, of the wind measurement signal;
determining, by the programmable processor, if the wind measurement signal exceeds a predetermined windspeed value;
determining a humidity measurement;
generating a humidity measurement signal in response to the humidity measurement having been determined;
sending the humidity measurement signal to the programmable processor;
determining if the humidity measurement signal is above a predetermined humidity value; and
upon determining that the wind measurement signal exceeds the predetermined windspeed value and that the humidity measurement is not above the predetermined humidity value, send a disconnect signal to a power disconnect device;
in response to receiving the disconnect signal, disconnecting by the power disconnect device of the power distribution system from the power source;
upon determining that the wind measurement signal exceeds the predetermined windspeed value and that the humidity measurement is above the predetermined humidity value, inhibiting the sending of the disconnect signal to the power disconnect device, whereby the power distribution system is not disconnected from the power source when the humidity measurement is above the predetermined humidity value.

9. The method of claim 7, further comprising:
wherein the determining the temperature measurement is by a temperature sensor;
wherein the sending the temperature signal to the programmable processor is by the temperature sensor;
wherein the determining if the temperature measurement exceeds the predetermined temperature value is by the programmable processor; and
wherein the sending the disconnect signal to the power disconnect device is by the programmable processor.

10. The method of claim 8, further comprising:
wherein the determining the humidity measurement is by a humidity sensor;
wherein the sending the humidity measurement signal to the programmable processor is by the humidity sensor;
wherein the determining if the humidity measurement is above the predetermined humidity value is by the programmable processor; and
wherein the inhibiting the sending of the disconnect signal to the power disconnect device is by the programmable processor.

* * * * *